United States Patent [19]

Eaton et al.

[11] Patent Number: 5,507,040

[45] Date of Patent: Apr. 9, 1996

[54] METHOD AND APPARATUS FOR BATTERY SAVING IN A RADIO COMMUNICATION DEVICE

[75] Inventors: Eric T. Eaton, Lake Worth; Von A. Mock, Lantana; John J. Parkes, Boynton Beach, all of Fla.

[73] Assignee: Motorola, Inc., Schaumburg, Ill.

[21] Appl. No.: 358,058

[22] Filed: Dec. 19, 1994

Related U.S. Application Data

[63] Continuation of Ser. No. 74,640, Jun. 10, 1993, abandoned.

[51] Int. Cl.$^6$ .................................................. H04B 7/00
[52] U.S. Cl. .................. 455/343; 455/38.3; 340/825.44
[58] Field of Search .................................. 455/38.3, 127, 455/229, 343; 340/311.1, 825.44, 825.72

[56] References Cited

U.S. PATENT DOCUMENTS

| | | |
|---|---|---|
| 3,855,576 | 12/1974 | Braun et al. . |
| 4,160,240 | 7/1979 | Partipilo . |
| 4,410,789 | 10/1983 | Story .................................. 340/825.72 |
| 4,423,416 | 12/1983 | Bailey et al. . |
| 4,631,737 | 12/1986 | Davis et al. . |
| 4,866,261 | 9/1989 | Pace . |
| 4,929,851 | 5/1990 | Pace . |
| 4,961,073 | 10/1990 | Drapac et al. .......................... 455/38.3 |
| 5,025,251 | 6/1991 | Mittel et al. ............................ 455/343 |
| 5,381,133 | 1/1995 | Erhart et al. ........................... 455/38.3 |

OTHER PUBLICATIONS

Motorola "Metro–Pageboy" Binary Digital Radio Pager A03TEC Series 148–174 MHz 68P81005C05 Copyright 1974 by Motorola, Inc.

*Primary Examiner*—Reinhard J. Eisenzopf
*Assistant Examiner*—Thanh Le
*Attorney, Agent, or Firm*—Kelly A. Gardner

[57] ABSTRACT

A method for battery saving in a battery powered radio communication device having a receiver for receiving a radio frequency (RF) signal comprises the step of enabling (100) the receiver for reception of the RF signal. The method further comprises the steps of determining (120) that the RF signal is being received at an off-signal data rate different from an on-signal data rate at which data is normally provided to the battery powered radio communication device and disabling (130) the receiver in response to determining that the RF signal is being received at the off-signal data rate.

18 Claims, 4 Drawing Sheets

METHOD AND APPARATUS FOR BATTERY SAVING IN A RADIO COMMUNICATION DEVICE

This is a continuation of application Ser. No. 08/074,640 filed on Jun. 10, 1993, now abandoned.

FIELD OF THE INVENTION

This invention relates in general to battery powered radio communication devices, and more specifically to a method and apparatus for extending battery life in a battery powered radio communication device.

Background of the Invention

Radio communication devices, such as pagers, are usually powered by small batteries having limited capacities, and thus limited battery life. From a user standpoint, this limited battery life, which often results in frequent battery replacement, is very undesirable. Therefore, radio communication devices typically employ battery saving techniques to extend the life of the battery.

Most battery saving techniques involve decreasing the amount of current supplied to selected areas of the radio communication device during different time periods. These methods are most effective when the selected areas include circuits, such as receiver circuitry, which normally drain relatively large amounts of current.

By way of example, in communication systems which use POCSAG (Post Office Code Standardization Advisory Group) paging format, a radio frequency (RF) signal having a specific data rate is typically transmitted in batches, each of which includes a specific number of frames. A radio communication device included within the communication system may be assigned to receive messages in one or more of the frames. A popular battery saving method, therefore, involves providing power to the receiver circuitry during the assigned frame or frames and removing or reducing power to the receiver circuitry during all but the assigned frames. In this manner, the receiver circuitry significantly drains the battery only while receiving the RF signal during the assigned frames. Additionally, the receiver circuitry may be "turned off" when noise is detected. This occurs in many communication systems when the radio communication device is out of range of the paging transmitter or when the paging transmitter is turned on and off in cycles, resulting in time periods in which no RF signal is transmitted.

In some existing communication systems, however, the paging transmitter transmits an RF signal at all times. The transmitter may, for example, continuously transmit the RF signal at a given data rate or, more commonly, transmit the RF signal at two different data rates at different times. In the latter case, the RF signal is transmitted at a first data rate when information is provided to radio communication devices. Between transmissions at the first data rate, when no information is to be transmitted to the radio communication devices, the RF signal is transmitted at a second data rate which is different from the first data rate at which the radio communication devices normally receive data and which is meaningless to the radio communication devices. Therefore, because the transmitter transmits at all times, the risk of destroying transmitter components is reduced compared to systems in which transmitters are cycled on and off. Furthermore, because the transmitter transmits at all times, noise is not normally present on the RF frequency unless the radio communication device is out of range of the paging transmitter or interference is present on the signal. As a result, current battery saving schemes, which typically disable the receiving circuitry of a radio communication device when noise is received, may be less effective.

Thus, what is needed is an improved battery saving technique for use in a paging system wherein the paging transmitter continuously transmits an RF signal at different data rates.

A battery powered radio communication device includes a receiver for receiving a radio frequency (RF) signal. A method for battery saving in the radio communication device includes the steps of enabling the receiver for reception of the RF signal, determining whether the RF signal is being received at a predetermined on-signal data rate at which data is normally provided to the battery powered radio communication device. It is further determined, substantially coincident with determining whether the RF signal is being received at the predetermined on-signal data rate, whether the RF signal is being received at a predetermined off-signal data rate which is not an integer multiple of the predetermined on-signal data rate. The receiver is disabled in response to determining that the RF signal is being received at the predetermined off-signal data rate.

A radio communication device for receiving and processing a radio frequency (RF) signal is powered by a battery and includes a receiver for receiving the RF signal and an on-signal baud rate detector coupled to the receiver for determining whether the RF signal is being received at a predetermined on-signal data rate at which data is normally provided to the radio communication device. A decoder coupled to the receiver and the on-signal baud rate detector decodes the RF signal in response to the on-signal baud rate detector determining that the RF signal is being received at the predetermined on-signal data rate. An off-signal baud rate detector coupled to the receiver determines whether the RF signal is being received at a predetermined off-signal data rate which is not an integer multiple of the predetermined on-signal data rate. The on-signal and off-signal baud rate detectors search for the predetermined on-signal and predetermined off-signal data rates, respectively, at substantially coincident times. The radio communication device also includes power switching means coupled to the receiver and the off-signal baud rate detector for disabling the receiver in response to the off-signal baud rate detector determining that the RF signal is being received at the predetermined off-signal data rate.

DESCRIPTION OF A PREFERRED EMBODIMENT

Figure 1:
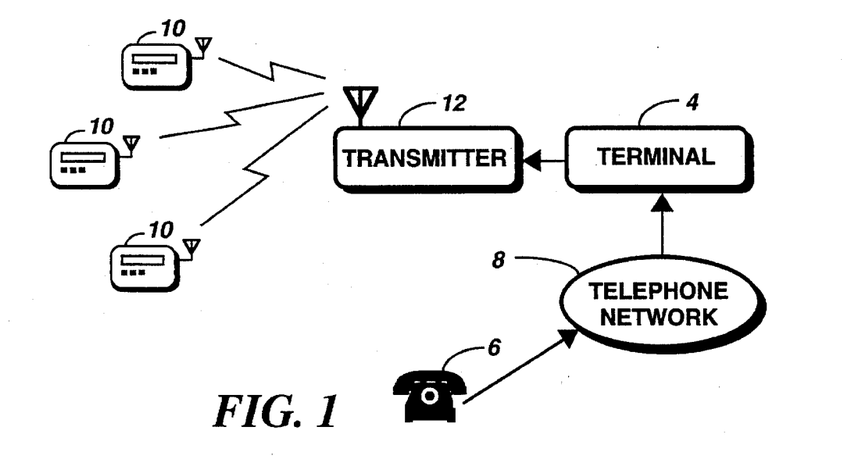
FIG. 1 is an illustration of a radio communication system in accordance with a preferred embodiment of the present invention.

FIG. 1 depicts a radio communication system, such as a paging system, which includes a paging terminal 4 for receiving messages from a conventional wired telephone 6, via a telephone network 8, or from another input device (not shown). Received messages are stored and periodically encoded into a format suitable for selective call messaging. Additionally, addresses associated with radio communication devices 10 for which one or more messages are intended are encoded with the messages. Examples of formats suitable for selective call messaging are the POCSAG (Post Office Code Standardization Advisory Group) signaling protocol and GSC (Golay Sequential Code), although it may be appreciated that other formats can be utilized as well.

The radio communication system further comprises a paging transmitter 12 which, in response to reception of the encoded information from the terminal 4, modulates the encoded information for transmission as a radio frequency (RF) signal at a first predetermined data rate, preferably 512 bps (bits per second). When the transmission of the information at 512 bps is concluded, the transmitter 12 transmits null data, i.e., meaningless data, at a second data rate until a next batch of encoded information is received from the terminal 4. The second data rate may be, for example, 300 bps. In this manner, the transmitter 12 is continuously transmitting an RF signal, albeit at different data rates. As a result, components included in the transmitter 12 are less likely to "burn out" than components included in a transmitter which cycles on to transmit encoded information and cycles off after the encoded information is transmitted.

Figure 2:
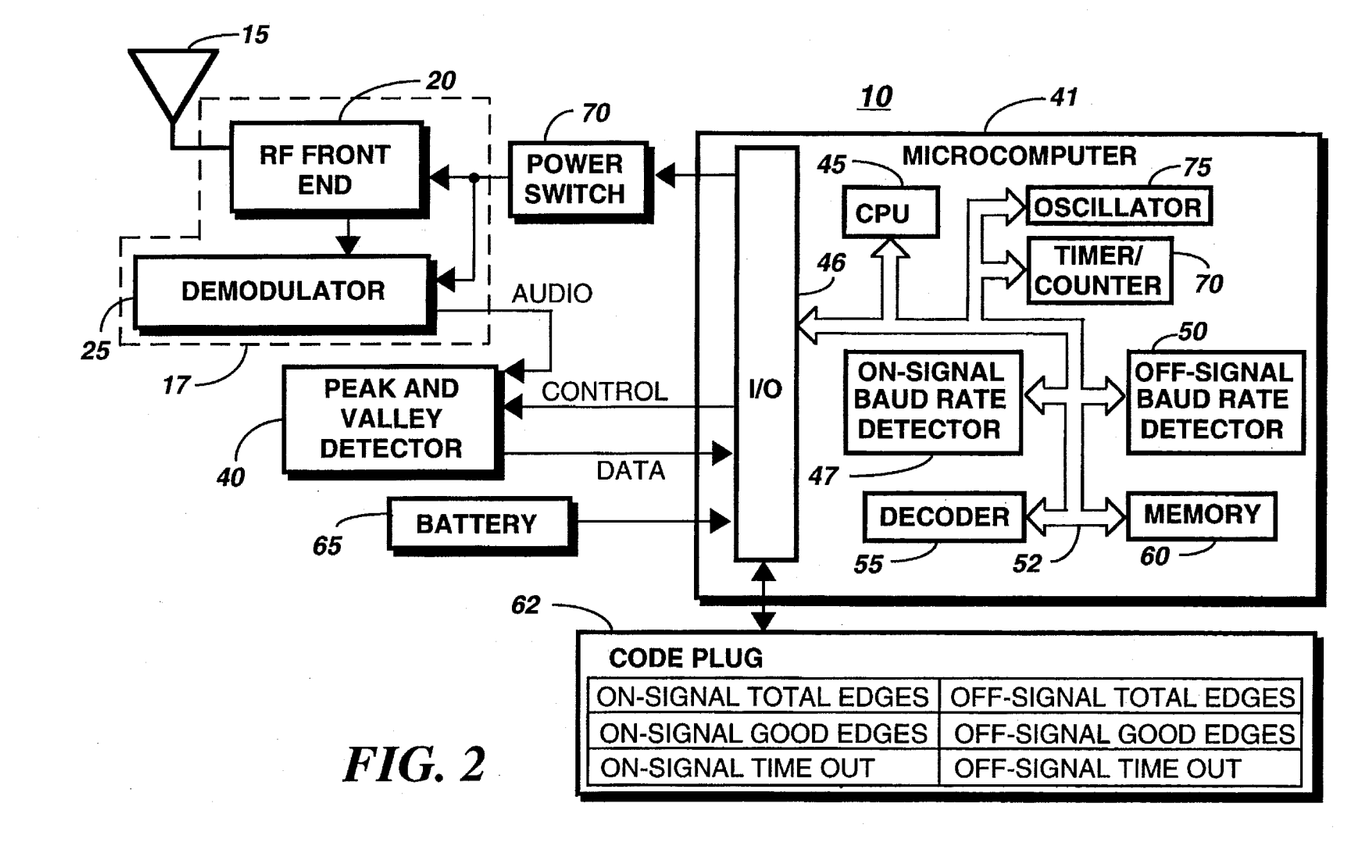
FIG. 2 is an electrical block diagram of a radio communication device included in the radio communication system of FIG. 1 in accordance with the preferred embodiment of the present invention.

FIG. 2 is an electrical block diagram of a radio communication device 10 for receiving the radio frequency (RF) signal transmitted by the paging transmitter 12. Preferably, the radio communication device 10 comprises an antenna 15 for receiving the RF signal and a receiver 17, which includes an RF front end 20 for converting and filtering the RF signal from the radio frequency to an intermediate frequency or baseband signal and a demodulator 25 coupled to the RF front end 20 for demodulating the baseband or intermediate frequency signal to generate an audio signal. Subsequently, the audio signal is provided to a peak and valley detector 40 for processing in a manner to be described below.

The radio communication device 10 further comprises a controller, which can be a microcomputer 41, such as the MC68HC05L6 microcomputer manufactured by Motorola, Inc. of Schaumburg, Ill. Alternatively, the controller may be implemented through hard-wired logic capable of performing equivalent operations.

In accordance with the preferred embodiment of the present invention, a central processing unit (CPU) 45 internal to the microcomputer 41 is coupled, via an input/output (I/O) bus 46, to the peak and valley detector 40. Preferably, the CPU 45 directs the peak and valley detector 40 to acquire peak and valley settings, i.e., high and low signal voltages, of the audio signal and generate therefrom digital data having rising and falling edges defined by transitions of the signal.

As described above, the paging transmitter 12 transmits at a first predetermined data rate, hereafter referred to as an "on-signal" data rate, to transmit messages to the radio communication device 10. Additionally, between transmissions of the RF signal at the on-signal data rate, the transmitter 12 transmits the RF signal at a second data rate, hereafter referred to as an "off-signal" data rate. The paging transmitter 12 in this manner avoids the necessity of cycling on and off, thereby reducing the risk of destroying transmitter components. At the off-signal data rate, the RF signal is preferably transmitted as a pattern of ones and zeros, e.g., 1-0- 1-0-1 . . . , although other predetermined patterns can be transmitted as well. Additionally, the off-signal data rate is preferably not an integer multiple of the on-signal data rate to avoid situations in which the radio communication devices 10 "false on" or "false off", i.e., erroneously identify the off-signal data rate as the on-signal data rate or vice versa.

The data generated by the peak and valley detector 40 is provided to on- signal and off-signal baud rate detectors 47, 50 coupled to the CPU 45 by an internal communication bus 52. The on-signal baud rate detector 47 monitors the edges, i.e., transitions, of the incoming data to determine whether the data is being received at the on-signal data rate, which is preferably 512 bps. For 512 bps, it has been statistically shown that a minimum of eleven edges are likely to occur in thirty-two (32) bit times. More specifically, at least eleven edges will occur approximately 98% of the time within sixty-three (63) ms (milliseconds), wherein the sixty-three ms time is given by the following formula:

$$\text{time (sec.)} = \text{bit times} * \frac{1}{\text{data rate } (bps)}$$

The on-signal baud rate detector 47 therefore preferably first determines whether, within the sixty-three ms time period, eleven edges occur. Additionally, when eleven edges are detected, the baud rate detector 47 further determines whether at least nine out of the eleven edges are "good" edges, i.e., edges that occur at the correct frequency. For 512 bps, by way of example, the edges should occur approximately 1.953 ms apart. The detection of the nine good edges ensures that the on-signal baud rate detector 47 will not mistakenly identify noise or an undesired signal as 512 bps. When the baud rate detector 47 does not find eleven edges or does not find nine good edges within eleven detected edges, it provides a "time out" signal to the CPU 45 to indicate that 512 bps is not present. When 512 bps is detected, the baud rate detector 47 alerts the CPU 45, in response to which the data is provided to a decoder 55 for recovering the messages and addresses included within the RF signal in a manner well known to one of ordinary skill in the art. The recovered messages are preferably stored in a memory 60, such as a random access memory (RAM), which can be internal to the microcomputer 41. A timer/counter 70 internal to the microcomputer 41 generates timing signals for such functions as decoding and baud rate detection, and an oscillator 75 provides the reference clock for the timer/counter 70. The radio communication device 10 further includes a programmable memory, such as a code plug 62, coupled to the microcomputer 41 for storing programmable values. The programmable values preferably comprise a time-out value, e.g., 32 bit times, for the on-signal data rate, the number of edges, e.g., eleven, to be detected before the on-signal baud rate detector 47 times out, and the number of good edges, e.g., nine, which must occur for identification of the on-signal data rate. A user of the radio communication device 10 can change these values, if necessary, by reprogramming the code plug 62 in a manner well known to one of ordinary skill in the art.

Similarly, the code plug 62 also stores the same type of programmable values for use by the off-signal baud rate detector 50. Because the RF signal at the off-signal data rate, e.g., 300 bps, is preferably transmitted as a pattern of ones and zeros, the 300 bps signal can be detected in significantly less time than the 512 bps signal. For instance, the code plug 62 can be programmed such that the off-signal baud rate detector 50 recognizes a 300 bps signal in response to detection of four good edges out of five detected edges. Furthermore, the code plug 62 can be programmed such that, if four good edges out of five edges are not detected, the off-signal baud rate detector 50 times out after five bit times. Therefore, in accordance with this example, the off-signal baud rate detector 50 either recognizes 300 bps or times out in approximately 16.67 ms (five edges*1/300 bps=16.67 ms). At this time, if 300 bps is not detected, it will be recognized by one of ordinary skill in the art that the on-signal baud rate detector 47 will still be operating to detect a 512 bps signal. The number of good edges, the number of edges, and the bit times before time-out can be programmed to any number of values, although the values mentioned above are preferable for operation of the radio communication device 10 when 512 bps is the on-signal data rate and 300 bps is the off-signal data rate. It will be appreciated that, when different on- and off-signal data rates, such as 1200 bps and 750 bps, are transmitted by the transmitter 12 (FIG. 1), the programmable values for use by the on- and off-signal baud rate detectors 47, 50 may be optimized at different values. It will be further appreciated that adjustment of the programmable values for use with the off-signal baud rate detector 50 may be necessary when the off-signal data rate is transmitted as patterns other than the pattern of ones and zeros mentioned above.

Similar to most conventional radio communication devices, the radio communication device 10 is powered by a battery 65, which is coupled to and supplies power to circuitry within the radio communication device 10 via the I/O bus 46. The capacity of the battery 65, as may be understood by one of ordinary skill in the art, is depleted when current is consumed by the circuitry within the radio communication device 10. The receiver 17, including the RF front end 20 and the demodulator 25, requires a relatively large amount of current, e.g., several milliamps of current when receiving the RF signal. Therefore, it is advantageous to employ a battery saving technique in which power is provided only intermittently to the receiver 17, thereby extending the life of the battery 65.

Preferably, a power switch 70 is utilized to couple the battery 65 to the receiver 17 when so directed by the CPU 45. In accordance with the preferred embodiment of the present invention, when the off-signal data rate, e.g., 300 bps, is detected by the off-signal baud rate detector 50 or when the on-signal baud rate detector 47 times out, the CPU 45 directs the power switch 70 to open, thereby disconnecting the receiver 17 from the battery 65. The power switch 70 is periodically closed to provide power to the receiver 17 until the RF signal is detected at the on-signal data rate, e.g., 512 bps. Preferably, the receiver 17 is enabled every second until the 512 bps signal is detected. Depending upon the signaling protocol utilized by the paging transmitter 12 (FIG. 1), the receiver 17 can be disabled even after reception of the 512 bps signal to further save the battery 65. By way of example, in some signaling protocols, the paging transmitter 12 transmits a predetermined number of groups of data during each 512 bps transmission. Each radio communication device is assigned to one or more of the groups and can simply shut down its receiver until a time when an assigned group is expected to be received.

By employing an off-signal baud rate detector 50 as well as an on-signal baud rate detector 47, and by disabling the receiver 17 in response to reception of the 300 bps signal, the radio communication device 10 utilizes significantly less current than a conventional radio communication device which simply attempts to detect the 512 bps signal. This may be better understood by referring to FIG. 3.

Figure 3:
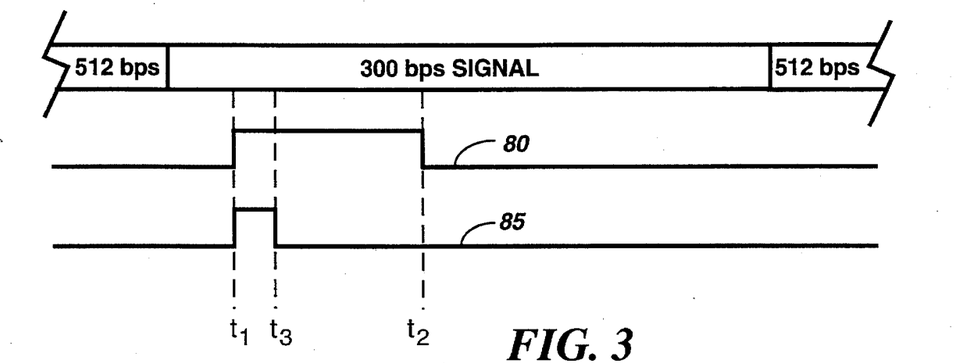
FIG. 3 is a timing diagram illustrating the on-times of a conventional receiver and a receiver included in the radio communication device of FIG. 2 in accordance with the preferred embodiment of the present invention.

FIG. 3 is a timing diagram illustrating the on-time of a receiver included in a conventional radio communication device (depicted as waveform 80) and the on-time of the receiver 17 included in the radio communication device 10 (depicted as waveform 85). As shown, when the conventional receiver is enabled, at time $t_1$, the baud rate detector included in the device attempts to detect 512 bps for approximately sixty-three ms, or thirty-two bit times, until the baud rate detector times out, at time $t_2$. When the receiver 17 of the radio communication device 10 is enabled at $t_1$, the off-signal baud rate detector 50 is able to detect the 300 bps signal in approximately 16.67 ms, or five bit times. In response to detection of the 300 bps signal, at time $t_3$, the receiver 17 is disabled to implement battery saving. Therefore, the receiver of the conventional radio communication device remains on for approximately 46.33 ms longer than the receiver 17 of the radio communication device 10 according to the present invention. If, as mentioned above, the receiver 10 and the conventional receiver are enabled once per second during the 300 bps transmission and the 300 bps signal is transmitted for one minute, the conventional receiver is enabled for 3.78 seconds, while the receiver 17 is enabled for only one second during transmission of the 300 bps signal. Therefore, the radio communication device 10 according to the present invention utilizes significantly less current during transmission of the 300 bps signal, resulting in greater battery life. If, for instance, the receiver 17 and the conventional receiver each require five milliamps of current to receive the RF signal and batteries powering the devices each have capacities of 500 milliamp-hours (mAH), the capacity of the battery powering the conventional radio communication device would be depleted by approximately nineteen (19) milliamp-seconds. The capacity of the battery 65 powering the radio communication device 10 would only be depleted by five (5) milliamp-seconds. In an actual experiment conducted using a conventional radio communication device and a radio communication device 10 built in accordance with the present invention, the battery 65 powering the radio communication device 10 in accordance with the present invention lasted twenty-two (22) days longer than the battery powering the conventional radio communication device.

In accordance with the preferred embodiment of the present invention, the radio communication device 10 can, in some cases, further reduce the on-time of the receiver 17 during reception of the 300 bps signal and during reception of the 512 bps signal. When first provided with power, the receiver 17 must "warm-up" before the CPU 45 can accurately process the incoming signal. This warm-up time allows receiver components, such as amplifiers, mixers, and oscillators, to stabilize and is primarily dependent on the type of receiver components. In conventional radio communication devices, the peak and valley settings of the incoming signal cannot be determined until after the warm-up time has passed. At this time, in a conventional radio communication device, a peak and valley detector is normally reset upon recognition of a desired signal, subsequent to which an incoming audio signal is tracked to determine the peak and valley settings. The reception of an undesired signal, i.e., noise or an RF signal at an off-signal data rate, then renders the previously acquired peak and valley settings useless. Therefore, in systems having transmitters which transmit at more than one data rate, conventional radio communication devices must typically re-acquire peak and valley settings after every transmission at an undesired data rate. In the system described above, wherein the paging transmitter 12 transmits a 300 bps RF signal between transmissions at 512 bps, a conventional radio communication device normally re-acquires the peak and valley settings at the beginning of each 512 bps transmission. Conversely, the radio communication device 10 according to the present invention can conveniently utilize the peak and valley settings acquired at 300 bps for decoding at 512 bps. Therefore, when the 512 bps signal is first recognized, the radio communication device 10 can eliminate the time necessary for the peak and valley detector (FIG. 2) to reset and track the incoming audio signal, thereby reducing the time in which data can be processed. Additionally, during 300 bps transmissions, the peak and valley settings acquired during an initial on-time can be used each time the receiver 17 is enabled unless noise is encountered.

Figure 4:
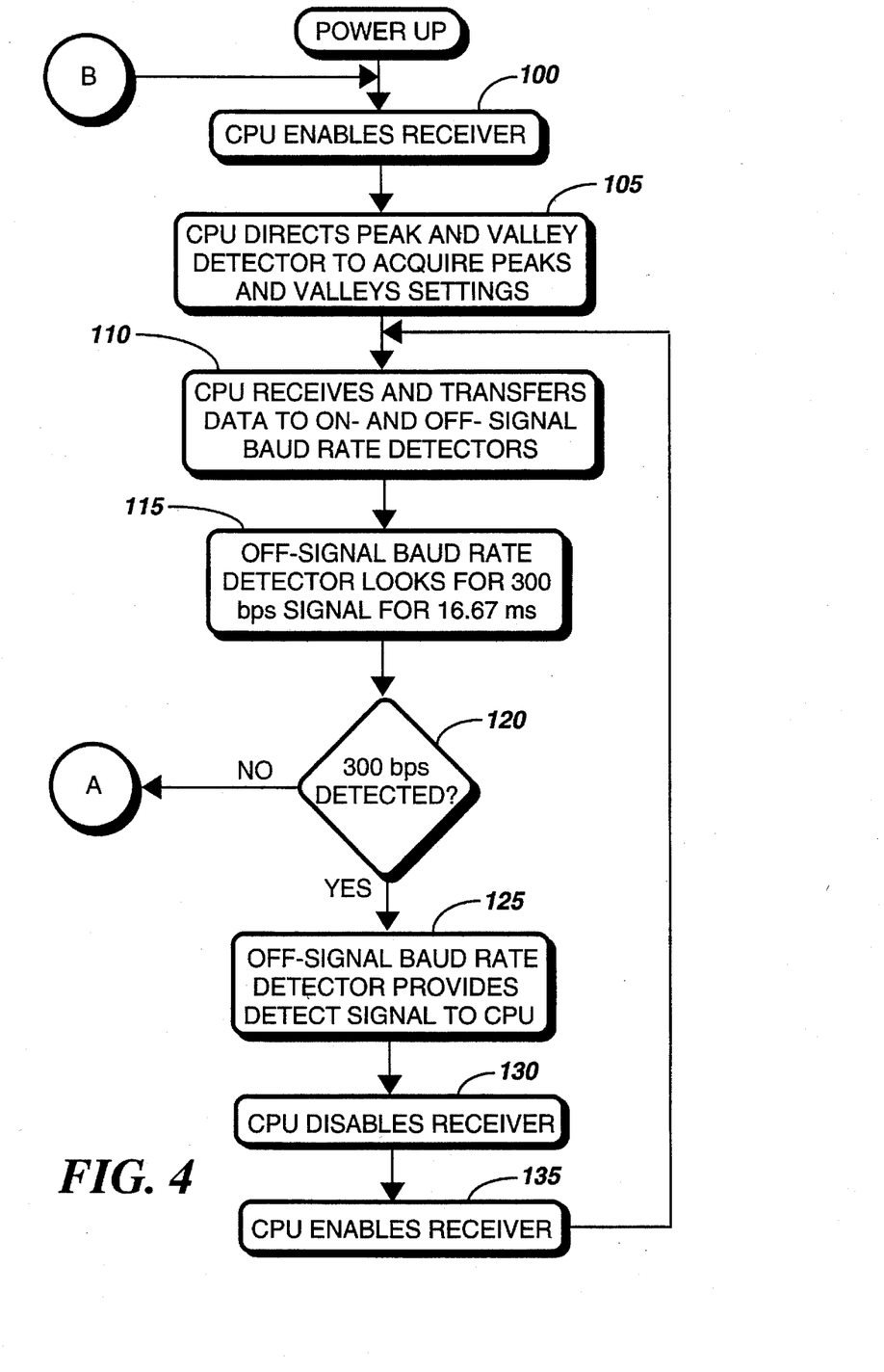
FIGS. 4 and 5 are flowcharts depicting the operation of the microcomputer included in the radio communication device of FIG. 2 in accordance with the preferred embodiment of the present invention.
Figure 5:
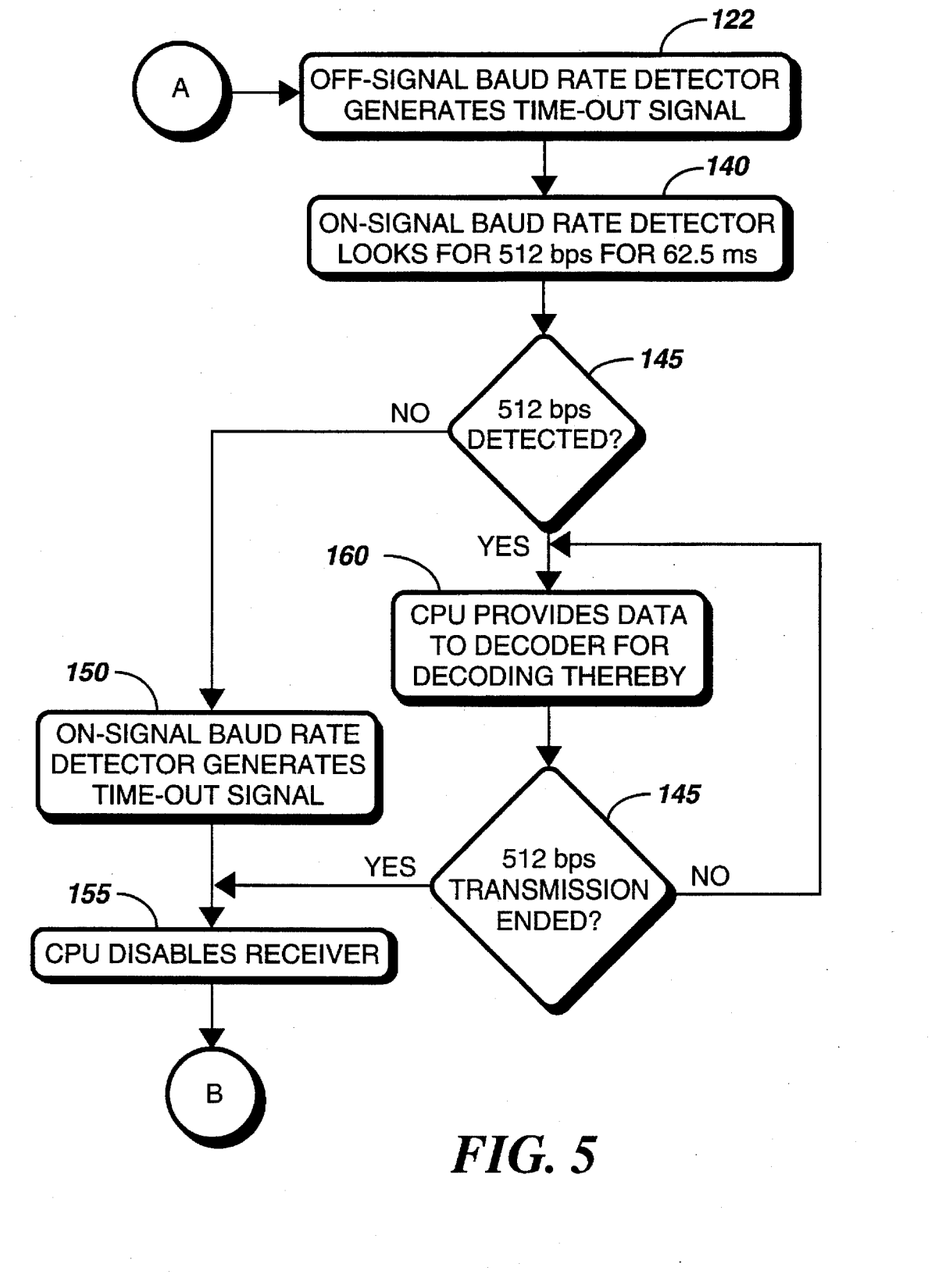

Referring next to FIGS. 4 and 5, flowcharts illustrate the operation of the microcomputer 41 (FIG. 2) in accordance with the preferred embodiment of the present invention. After the radio communication device 10 is powered up, the CPU 45 enables, at step 100, the receiver 17 for reception of the RF signal. As described above, this occurs when the CPU 45 transmits an enable signal to the power switch 70, in response to which the power switch 70 couples the receiver 17 to the battery 65 via the input/output bus 46. Additionally, the CPU 45 resets, at step 105, the peak and valley detector 40, which acquires the peak and valley settings of the incoming RF signal after the RF front end 20 and the demodulator 25 have stabilized. Subsequently, at step 110, the CPU 45 receives the data generated by the peak and valley detector 40 and provides the data to both the on- and off-signal baud rate detectors 47, 50. At step 115, the off-signal baud rate detector 50 monitors the edges of the data for an amount of time, which is dependent upon values programmed into the code plug 62, to detect the 300 bps signal. When, for example, the values in the code plug 62 are such that four good edges out of five detected edges indicate the presence of the 300 bps signal, the off-signal baud rate detector 50 will monitor the incoming data for approximately 16.67 ms. At step 120, when the off-signal baud rate detector 50 does not detect the 300 bps signal, a time-out signal is provided, at step 122, to the CPU 45.

When the 300 bps signal is detected, at step 120, the off-signal baud rate detector 50 generates a "detect" signal, at step 125. In response to reception of the detect signal, the CPU 45 disables the receiver 17, at step 130. In this manner, battery saving is implemented after only 16.67 ms during transmission of the off-signal data rate by the paging transmitter 12 (FIG. 1). In a conventional receiver, on the other hand, battery saving is not implemented until a baud rate detector included therein times out after approximately 63 ms. Therefore, in the radio communication device 10 in accordance with the present invention, the receiver 17 is enabled for approximately 46 ms less than a conventional receiver during transmission of the 300 bps signal.

As in conventional radio devices, the receiver 17 is subsequently enabled, at step 135. However, unlike conventional radio devices, in the radio communication device 10, the peak and valley settings of the received signal need not be re-acquired at the subsequent receiver on-time. Instead, after the RF front end 20 (FIG. 2) and the demodulator 25 stabilizes, the CPU 45, at step 110, immediately receives and transfers the data from the peak and valley detector 40 to the baud rate detectors 47, 50, thereby further reducing current drain on the battery 65.

The on- and off-signal baud rate detectors 47, 50 operate independently at the direction of the CPU 45. Therefore, as the off-signal baud rate detector 50 is looking for the 300 bps signal, the on-signal baud rate detector 47 is looking for the 512 bps signal, at step 140. The on-signal baud rate detector 47 monitors the incoming data until nine out of eleven detected edges are determined to be "good" edges or until the baud rate detector 47 times out. Preferably, the baud rate detector 47 times out after thirty-two bit times or approximately 63 ms. When, at step 145, the 512 bps signal is not detected, i.e., when the on-signal baud rate detector 47 times out, a time-out signal is provided, at step 150, to the CPU 45, in response to which the CPU 45 disables the receiver 17, at step 155. Because neither the 300 bps signal nor the 512 bps signal has been detected, indicating the presence of noise, the peak and valley settings are re-acquired when the receiver 17 is subsequently enabled, at step 100.

When, at step 145, the 512 bps signal is detected, the CPU 45 provides the data to the decoder 55, which recovers messages and addresses included in the RF signal, at step 160. Thereafter, when the 512 bps transmission ends, at step 165, the receiver 17 is disabled, at step 155, to implement battery saving. Preferably, when the receiver 17 is again enabled, at step 100, the peak and valley settings of the RF signal are reacquired. However, it will be appreciated that in alternate embodiments of the present invention, the same peak and valley settings can be utilized when the receiver 17 is again provided with power.

In summary, a radio communication system includes a paging transmitter which transmits data, such as messages, in an RF signal transmitted at a first data rate, i.e., an on-signal data rate, and transmits null data at a second data rate, i.e., an off-signal data rate, in between transmissions at the on-signal data rate. In this manner, the paging transmitter continuously transmits, rather than cycling on and off, and therefore reduces the risk of destroying transmitter components. A radio communication device, such as a pager, included in the paging system advantageously utilizes the off-signal data rate, at which null data is transmitted, for battery saving. More specifically, the radio communication device independently looks for both data rates and, in response to reception of the off-signal data rate, disables receiver circuitry included therein. Because the off-signal data rate can be detected very quickly, the receiver circuitry remains on for only a small amount of time, e.g., 17 ms.

In conventional radio devices, on the other hand, the RF signal is monitored for only the on-signal data rate. As a result, the receiver circuitry of the conventional radio device is only turned off in response to the baud rate detector "timing out", i.e., not recognizing the on-signal data rate after a designated amount of time. This amount of time is typically on the order of 60–70 ms. Therefore, the battery powering the conventional radio device is drained by the receiver circuitry for significantly greater amounts of time than the battery powering the radio communication device in accordance with the present invention.

It may be appreciated by now that there has been provided improved battery saving technique for use in a paging system wherein the transmitter continuously transmits an RF signal at different data rates.

We claim:

1. A method for battery saving in a battery powered radio communication device comprising a receiver for receiving a radio frequency (RF) signal, the method comprising the steps of:

enabling the receiver for reception of the RF signal;

determining whether the RF signal is being received at a predetermined on-signal data rate at which data is normally provided to the battery powered radio communication device;

determining, substantially coincident with determining whether the RF signal is being received at the predetermined on-signal data rate, whether the RF signal is being received at a predetermined off-signal data rate which is not an integer multiple of the predetermined on-signal data rate; and disabling the receiver in response to determining that the RF signal is being received at the predetermined off-signal data rate.

2. The method according to claim 1, further comprising the steps of:

acquiring, subsequent to the enabling step and prior to the disabling step, peak and valley settings of the RF signal;

enabling the receiver for reception of the RF signal at a predetermined time after disabling the receiver;

determining that the RF signal is being received at the predetermined on-signal data rate; and utilizing the peak and valley settings acquired when the RF signal was received at the predetermined off-signal data rate to recover data included In the RF signal received at the predetermined on-signal data rate.

3. The method of claim 1, wherein the off-signal data rate is transmitted utilizing a predetermined data pattern, and wherein the disabling step comprises the step of:

disabling the receiver in response to determining that the RF signal is being received at the predetermined off-signal data rate, wherein the detection of the off-signal data rate is performed in substantially less time than is the detection of the on-signal data rate.

4. A method for battery saving in a radio communication device comprising a receiver powered by a battery, wherein the radio communication device is included in a radio communication system comprising a transmitter for transmitting a radio frequency (RF) signal, the method comprising the steps of:

the transmitter transmitting the RF signal at a predetermined on-signal data rate when data is to be provided to the radio communication device;

the transmitter transmitting the RF signal at a predetermined off-signal data rate between transmissions at the on-signal data rate, wherein the predetermined off-signal data rate is not an integer multiple of the on-signal data rate;

the radio communication device enabling the receiver for reception of the RF signal;

the radio communication device determining whether the RF signal is being transmitted at the predetermined on-signal data rate or the predetermined off-signal data rate by searching specifically for both the predetermined on-signal data rate and the predetermined off-signal data rate at substantially coincident times;

the radio communication device processing the RF signal to recover the data included therein in response to determining that the RF signal is being transmitted at the predetermined on-signal data rate; and the radio communication device disabling the receiver in response to determining that the RF signal is being transmitted at the predetermined off-signal data rate.

5. The method according to claim 4, further comprising the steps of:

the radio communication device determining that the RF signal is not being transmitted at either the predetermined on-signal data rate or the predetermined off-signal data rate: and the radio communication device disabling the receiver in response thereto.

6. The method according to claim 4, further comprising, in the radio communication receiver, the step of:

acquiring, subsequent to the enabling step and prior to the determining step, peak and valley settings of the RF signal.

7. The method according to claim 6, further comprising, in the radio communication device, the steps of:

enabling the receiver for reception of the RF signal at a predetermined time after the step of disabling the receiver;

determining that the RF signal is being received at the predetermined on-signal data rate; and utilizing the peak and valley settings acquired when the RF signal was received at the predetermined off-signal data rate to recover data included in the RF signal received at the predetermined on-signal data rate.

8. The method of claim 4, wherein the off-signal data rate is transmitted utilizing a predetermined data pattern, and wherein the disabling step comprises the step, in the radio communication receiver, of:

disabling the receiver in response to determining that the RF signal is being transmitted at the predetermined off-signal data rate, wherein the detection of the off-signal data rate is performed in substantially less time than is the detection of the on-signal data rate.

9. A radio communication device for receiving and processing a radio frequency (RF) signal, wherein the radio communication device is powered by a battery, the radio communication device comprising:

a receiver for receiving the RF signal;

an on-signal baud rate detector coupled to the receiver for determining whether the RF signal is being received at a predetermined on-signal data rate at which data is normally provided to the radio communication device;

a decoder coupled to the receiver and the on-signal baud rate detector for decoding the RF signal in response to the on-signal baud rate detector determining that the RF signal is being received at the predetermined on-signal data rate;

an off-signal baud rate detector coupled to the receiver for determining whether the RF signal is being received at a predetermined off-signal data rate which is not an integer multiple of the predetermined on-signal data rate, wherein the on-signal and off-signal baud rate detectors search for the predetermined on-signal and predetermined off-signal data rates, respectively, at substantially coincident times; and power switching means coupled to the receiver and the off-signal baud rate detector for disabling the receiver in response to the off-signal baud rate detector determining that the RF signal is being received at the predetermined off-signal data rate.

10. The radio communication device according to claim 9, further comprising:

a programmable memory coupled to the on-signal and off-signal baud rate detectors for storing values utilized by the on-signal and off-signal baud rate detectors to determine whether the RF signal is being received at the predetermined on-signal data rate or the predetermined off-signal data rate.

11. The radio communication device according to claim 9, wherein the power switching means comprises:

a switch coupled between the battery and the receiver; and a microcomputer coupled to the switch and the off-signal baud rate detector for opening the switch to decouple the battery and the receiver in response to the off-signal baud rate detector determining that the RF signal is being received at the predetermined off-signal data rate and for subsequently closing the switch to couple the battery and the receiver such that receiver is again enabled for reception of the RF signal.

12. The radio communication device according to claim 11, further comprising:

a peak and valley detector coupled to the receiver for acquiring peak and valley settings of the RF signal and for storing the peak and valley settings when the RF signal is received at the predetermined off-signal data rate, wherein the peak and valley settings are utilized by the decoder for data recovery when the RF signal is received at the predetermined on-signal data rate subsequent to being received at the predetermined off-signal data rate.

13. The radio communication device of claim 9, wherein the off-signal data rate is transmitted utilizing a predetermined data pattern, and wherein the detection of the off-signal data rate occurs in substantially less time than does the detection of the on-signal data rate.

14. A radio communication system for radio communication between devices, comprising:

a paging transmitter for transmitting a radio frequency (RF) signal at a predetermined on-signal data rate when data is included in the RF signal and for transmitting the RF signal at a predetermined off-signal data rate between transmissions at the predetermined on-signal data rate, wherein the predetermined off-signal data rate is not an integer multiple of the predetermined on-signal data rate;

a radio communication device for receiving the RF signal, the radio communication device comprising:

a battery for powering the radio communication device a receiver coupled to the battery for receiving the RF signal;

an on-signal baud rate detector coupled to the receiver for determining whether the RF signal is being received at the predetermined on-signal data rate;

a decoder coupled to the receiver and the on-signal baud rate detector for decoding the RF signal in response to the on-signal baud rate detector determining that the RF signal is being received at the predetermined on-signal data rate;

an off-signal baud rate detector coupled to the receiver for determining whether the RF signal is being received at the predetermined off-signal data rate different from the predetermined on-signal data rate, wherein the on-signal and off-signal baud rate detectors search for the predetermined on-signal and predetermined off-signal data rates, respectively, at substantially coincident times; and power switching means coupled to the receiver and the off-signal baud rate detector for disabling the receiver in response to the off-signal baud rate detector determining that the RF signal is being received at the predetermined off-signal data rate.

15. The radio communication system according to claim 14, wherein the radio communication device further comprises:

a programmable memory coupled to the on-signal and off-signal baud rate detectors for storing values utilized by the on-signal and off-signal baud rate detectors to determine whether the RF signal is being received at the predetermined on-signal data rate or the predetermined off-signal data rate.

16. The radio communication system according to claim 14, wherein the power switching means of the radio communication device comprises:

a switch coupled between the battery and the receiver; and a microcomputer coupled to the switch and the off-signal baud rate detector for opening the switch to decouple the battery and the receiver in response to the off-signal baud rate detector determining that the RF signal is being received at the predetermined off-signal data rate and for subsequently closing the switch to, couple the battery and the receiver such that receiver is again enabled for reception of the RF signal.

17. The radio communication system according to claim 16, wherein the radio communication device further comprises:

a peak and valley detector coupled to the receiver for acquiring peak and valley settings of the RF signal and for storing the peak and valley settings when the RF signal is received at the predetermined off-signal data rate, wherein the peak and valley settings are utilized by the decoder for data recovery when the RF signal is received at the predetermined on-signal data rate subsequent to being received at the predetermined off-signal data rate.

18. The radio communication system of claim 14, wherein the off-signal data rate is transmitted utilizing a predetermined data pattern, and wherein the detection of the off-signal data rate occurs in substantially less time than does the detection of the on-signal data rate.

* * * * *